US008761540B2

(12) United States Patent
Yang et al.

(10) Patent No.: US 8,761,540 B2
(45) Date of Patent: Jun. 24, 2014

(54) METHOD AND SYSTEM FOR ESTIMATING NOISE LEVEL

(75) Inventors: Zhi Yang, Vernon Hills, IL (US); Alexander Zamyatin, Hawthorn Woods, IL (US); Satoru Ohishi, Tochigi-ken (JP); Anusha Muthu-Natarajan, Buffalo Grove, IL (US)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 276 days.

(21) Appl. No.: 13/160,111

(22) Filed: Jun. 14, 2011

(65) Prior Publication Data

US 2012/0321157 A1  Dec. 20, 2012

(51) Int. Cl.
*G06K 9/40* (2006.01)

(52) U.S. Cl.
USPC .......................................................... 382/275

(58) Field of Classification Search
USPC ......................................... 128/901; 382/275
See application file for complete search history.

(56) References Cited

U.S. PATENT DOCUMENTS

| 7,386,158 | B2 | 6/2008 | Yamada |
| 7,760,825 | B2 * | 7/2010 | Alcouffe ...................... 375/346 |
| 2003/0161548 | A1 | 8/2003 | Vuylsteke |
| 2004/0066978 | A1 | 4/2004 | Nanbu |
| 2009/0232269 | A1 * | 9/2009 | Hsieh et al. ........................ 378/5 |

FOREIGN PATENT DOCUMENTS

| JP | 2002-133410 A | 5/2002 |
| JP | 2003-319261 A | 11/2003 |
| JP | 2007-041834 A | 2/2007 |
| JP | 2007-260292 A | 10/2007 |
| WO | 02/086821 A1 | 10/2002 |

OTHER PUBLICATIONS

International Search Report for corresponding International Application No. PCT/JP2012/065279 mailed on Jul. 17, 2012.
Rank, K., Lendl, M., and Unbehauen, R., "Estimation of image noise variance", IEE Proc.-Vis. Image Signal Process, vol. 146, No. 2, pp. 80-84, Apr. 1999.
Corner, B.R., Narayanan, R.M., and Reichenbauch, S.E., "Noise estimation in remote sensing imagery using masking", Int. J. Remote Sensing, vol. 24, No. 4, pp. 689-702, 2003.
Gravel, Pierre, Beaudoin, Gilles, and De Guise, Jacques, A., "A Method for Modeling Noise in Medical Images", IEEE Translations on Medical Imaging, vol. 23, No. 10., pp. 1221-1232, Oct. 2004.
Tai., Shen-Chuan, Yang, Shih-Ming, "A Fast Method for Image Noise Estimation Using Laplacian Operator and Adaptive Edge Detection", ISCCSP, 2008, Malta, 12-14, pp. 1077-1081, Mar. 2008.

(Continued)

*Primary Examiner* — Gregory F Cunningham
(74) *Attorney, Agent, or Firm* — Yoshida & Associates, LLC (57) ABSTRACT

Noise assessment is important to image quality evaluation as well as image processing. For example, the noise level estimation is used as criteria for terminating an iterative noise reduction process. To determine a meaningful noise level, the pixels in featureless regions are separated from the rest of the image. A new concept of pseudo-standard deviation (PSD) is introduced to automatically determine simple and reliable noise level estimates. Furthermore, a histogram of PSD is constructed with fine bins to calculate the moving average of the histogram. The first peak in filtered histogram gives the most representative noise measure as a desired approximation of true standard deviation.

37 Claims, 11 Drawing Sheets

(56) References Cited

OTHER PUBLICATIONS

Mendrik, Adriënne M., Vonken, Evert-Jan, Rutten, Annemarieke, Viergever, Max A., and van Ginneken, Bram, "Noise Reduction in Computed Tomography Scans Using 3-D Anisotropic Hybrid Diffusion With Continuous Switch", IEEE Transactions on Medical Imaging, vol. 28, No. 10, pp. 1585-1594, Oct. 2009.

Z. Yang, A. Anusha, A. A. Zamyatin, "Practical Noise Assessment Method," IEEE NSS/MIC, Knoxville, 2010.

* cited by examiner

METHOD AND SYSTEM FOR ESTIMATING NOISE LEVEL

FIELD OF THE INVENTION

The current invention generally relates to an image processing method and system for estimating noise in images reconstructed from data using various modalities.

BACKGROUND OF THE INVENTION

Noise assessment is important to image quality evaluation. When an image is said to be noisier or less noisy than other images, a certain determination on the image noise level is made based upon either a subjective visual evaluation or a predetermined metric. In this regard, the prior art attempts provided elaborate manual measurements of the noise level in regions of interest. Subjective evaluation is time-consuming and expensive and lacks uniform criteria. In other words, subjective evaluation is operator dependent. Furthermore, the manual noise assessment techniques are also not generally compatible with an automatic process for the subjective evaluation.

In the prior art attempts, a single indiscriminate index has been provided for spatially variant noise, and the noise index is not fully representative of an entire image. For example, even if a predetermined common metric such as standard deviation (SD) is deduced from an image, SD still lacks reliable results in noise assessment for certain image. In this regard, one exemplary technique applied Laplacian to images for removing edge pixels according to edge detection, and noise was assessed by either average or variance from the remaining pixels of the Laplacian result. The Laplacian methods measured noise from the manipulated image, that is, not from image directly.

In other prior art automatic noise assessment techniques, although noise is assumed to be dependent on imaging modalities, its noise models were complicated. Other simpler prior art automatic noise assessment techniques such as a twin image subtraction method required two reconstructions from odd and even views of the CT acquisition sequence, which makes it not be viable for iterative processing, where image noise change from iteration to iteration.

In view of the prior art noise assessment techniques, a method and a system of reliably determining a noise level is desired without human intervention for substantially all imaging modalities without requiring a complex noise model.

DETAILED DESCRIPTION OF THE PREFERRED EMBODIMENT(S)

To make a meaningful and reliable assessment of noise, the pixels or signals in featureless regions are separated from the rest of the image, and noise is determined in the featureless regions according to one aspect of the current invention. Since featureless regions do not always clearly exist in an image, the regions with constant or slow varying mean values are often sought before making noise assessment in exemplary methods and systems according to the current invention. In exemplary methods and systems, the mean values are preferably around the middle of the data value ranges. Thus, the current invention is directed to a method and a system for evaluating a noise level among the most noise-perceivable pixels so as to produce substantially reliable noise assessment in most image cases.

In this regard, noise assessment is preferably performed in the tissue regions or pixels where noise is well developed without system distortion according to one aspect of the current invention. These tissue regions are generally over soft tissues in CT and ultrasound images. For example, in CT images, soft tissue regions correspond to the middle of the HU range (−100 HU-100 HU in the range of −1000 HU-1000 HU). On the other hand, small structures in lung images make noise assessment difficult without sacrificing reliability. In addition, since tumors and lesions have generally low contrast from surrounding healthy tissue and a narrower display range or window is needed from diagnosis point of view, noise assessment becomes more of an issue in these images. In the case of ultrasound imaging, noise assessment is preferred among the soft tissue pixels, where sufficient and statistically stable speckle noise is well developed.

For a practical application of noise evaluation, reliable noise level determination is important to evaluate effectiveness of a noise-reducing filter. Although the noise filter is generally applied to reduce certain noise or artifacts in an image, the effectiveness of a noise-reducing filter often remains illusive or subjective. In other situations, while a certain noise-reducing filter substantially reduces target noise, the same noise-reducing filter unfortunately causes yet another set of noise or artifact in the filtered image. For these reasons, the reliable noise level determination is important to evaluate effectiveness of noise-reducing filters.

Reliable noise level determination is also important to establish predetermined criteria for terminating an iterative noise reduction process according to yet another aspect of the current invention. For this purpose, noise assessment is preferably made among the pixels at mid-level intensities and having slow varying mean, which are often the majority of the pixels in an image and provide good statistical measures. According to embodiments of the current invention, a universal noise estimator performs on signals an effective and practical noise assessment method based upon pseudo-standard deviation (PSD) and histogram analyses.

A histogram approach optionally identifies the above described pixels or signals so as to provide a reliable noise assessment result in certain exemplary methods and systems according to the current invention. Compared to fast change regions such as edges, lines and small patches, the slow varying regions are usually large and have significantly more pixel populations. These factors justify a histogram approach to separate the low varying regions and allow the separated regions to undergo the noise level analysis. With the histogram approach, a bin size is critical to the robustness and accuracy of the noise assessment results. In general, large bins make the histogram approach stable, but less accurate. On the other hand, small bins make the calculation precise, but less stable. In exemplary methods and systems according to the current invention, a relatively small bin size is initially utilized to obtain the above described histograms, and then the bin size is enlarged by utilizing moving average while the precision of the bin location is maintained.

In general, the signals can be some measured data corrupted by random noise or image data after certain reconstruction according to the current invention. In the following description of embodiments of the universal noise estimator device according to the current invention, image data after reconstruction are used to illustrate a method of determining PSD as a reliable noise index. The illustrative method of determining the PSD noise index in the image data is substantially applicable to a method of determining the PSD noise index in the measured data.

The use of image data has some practical advantages over the measured data according to some aspects of the current invention. Since the image data generally have pixel values and are not limited by the input devices such as detectors, the image data are more general and versatile than the measured data. At least for these reasons, the use of the image data in the image domain is advantageous in implementing a fully automatic and functionally simple noise assessment method.

Figure 1:
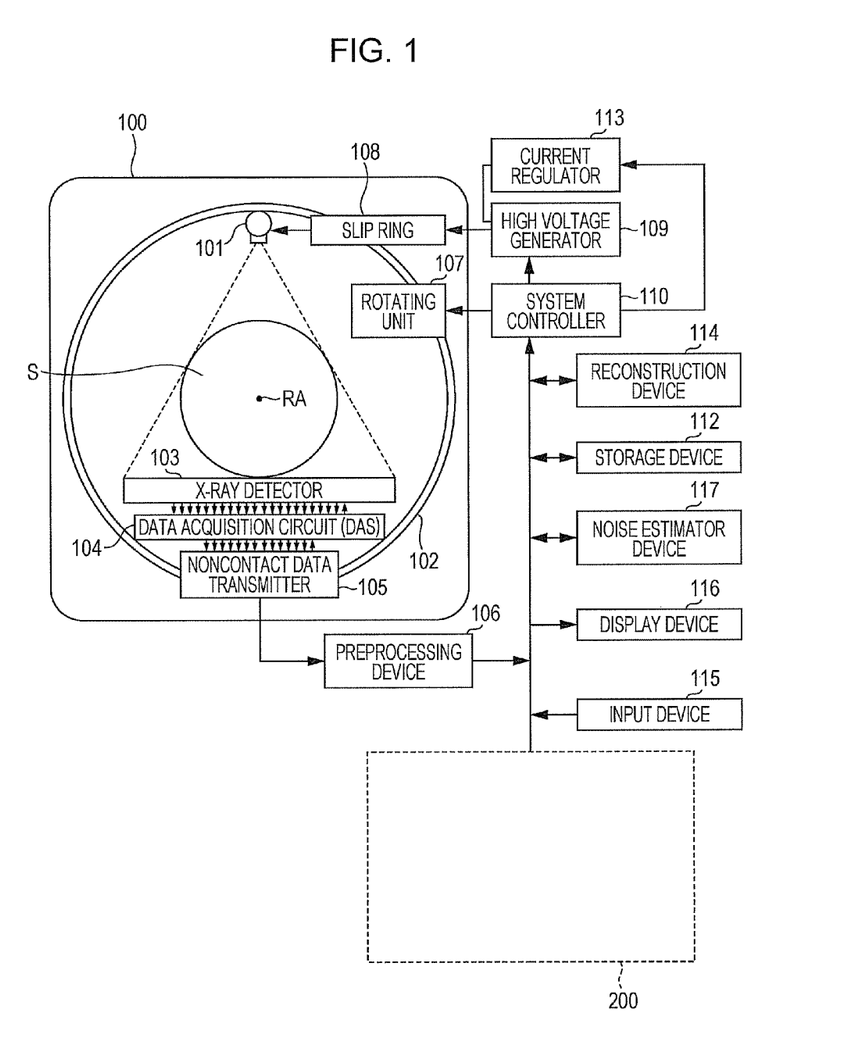
FIG. 1 is a diagram illustrating one embodiment of the multi-slice X-ray CT apparatus or scanner according to the current invention including a gantry 100 and other devices or units.

Referring now to the drawings, wherein like reference numerals designate corresponding structures throughout the views, and referring in particular to FIG. 1, a diagram illustrates one embodiment of the multi-slice X-ray CT apparatus or scanner according to the current invention including a gantry 100 and other devices or units. The gantry 100 is illustrated from a front view and further includes an X-ray tube 101, an annular frame 102 and a multi-row or two-dimensional array type X-ray detector 103. The X-ray tube 101 and X-ray detector 103 are diametrically mounted across a subject S on the annular frame 102, which rotates around axis RA. A rotating unit 107 rotates the frame 102 at a high speed such as 0.4 sec/rotation while the subject S is being moved along the axis RA into or out of the illustrated page.

The multi-slice X-ray CT apparatus further includes a current regulator 113 and a high voltage generator 109 that applies a tube voltage to the X-ray tube 101 so that the X-ray tube 101 generates X ray. In one embodiment, the high voltage generator 109 is mounted on the frame 102. The X rays are emitted towards the subject S, whose cross sectional area is represented by a circle. The X-ray detector 103 is located at an opposite side from the X-ray tube 101 across the subject S for detecting the emitted X rays that have transmitted through the subject S.

Still referring to FIG. 1, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR).

The above described data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, a display device 116, an input device 115, and a scan plan support apparatus 200. The scan plan support apparatus 200 includes a function for supporting an imaging technician to develop a scan plan.

One embodiment of the current invention further includes a combination of various software modules and hardware components for implementing a noise estimator device 117. In the current application, the noise estimator device 117 is synonymous with a universal noise estimator and performs predetermined functions associated with determining a noise index, pseudo-standard deviation (PSD) and histogram analyses. The noise estimator device 117 is connected to the reconstruction device 114 and the storage device 112 via the data/control bus. The reconstruction device 114 reconstructs an image or generates image data based upon the projection data that is optionally stored in the storage device 112. The projection data is generated from measured data via the data acquisition circuit or the Data Acquisition System (DAS) 104 and the processing device 106. The measured data or signals in turn are detected at the X-ray detector 103. For the purpose of the current application, the term, data such as in image data and measured data is interchangeably used with the term signal such as in image signal and measured signal. The turn, signal itself broadly includes both image data and measured data.

In one embodiment, the noise estimator device 117 receives the reconstructed image data from the reconstruction device 114 and or the storage device 112 in order to perform the tasks on the image data for determining the PSD as a noise index in the histogram analyses. As described above, since the reconstructed image is in the image domain after reconstruction, the noise estimator device 117 is advantageously free from additional processing or limitations that are necessary for further processing measured data in the noise index determination.

In another embodiment, the noise estimator device 117 receives the measured data from the reconstruction device 114 and or the storage device 112 in order to perform the tasks on the measured data for determining the PSD as a noise index in the histogram analyses. As described above, since the measured data is in the data domain before reconstruction, the noise estimator device 117 is not necessarily free from additional processing or limitations for further processing the measured data in the noise index determination.

In either embodiment, the noise estimator device 117 performs a predetermined set of tasks on the received signals in determining PSD as a noise index substantially without human intervention. The automatic process or method is optionally controlled according to a predetermined set of parameters such as a size of bins in the histogram analyses and a threshold value for removing undesirable background data. Furthermore, the parameters also include a size or characteristics of a kernel for filtering the signals or data in determining PSD as a noise index. The above described parameters are illustrative only and are not limited to the enumerated specific examples.

Figure 2:
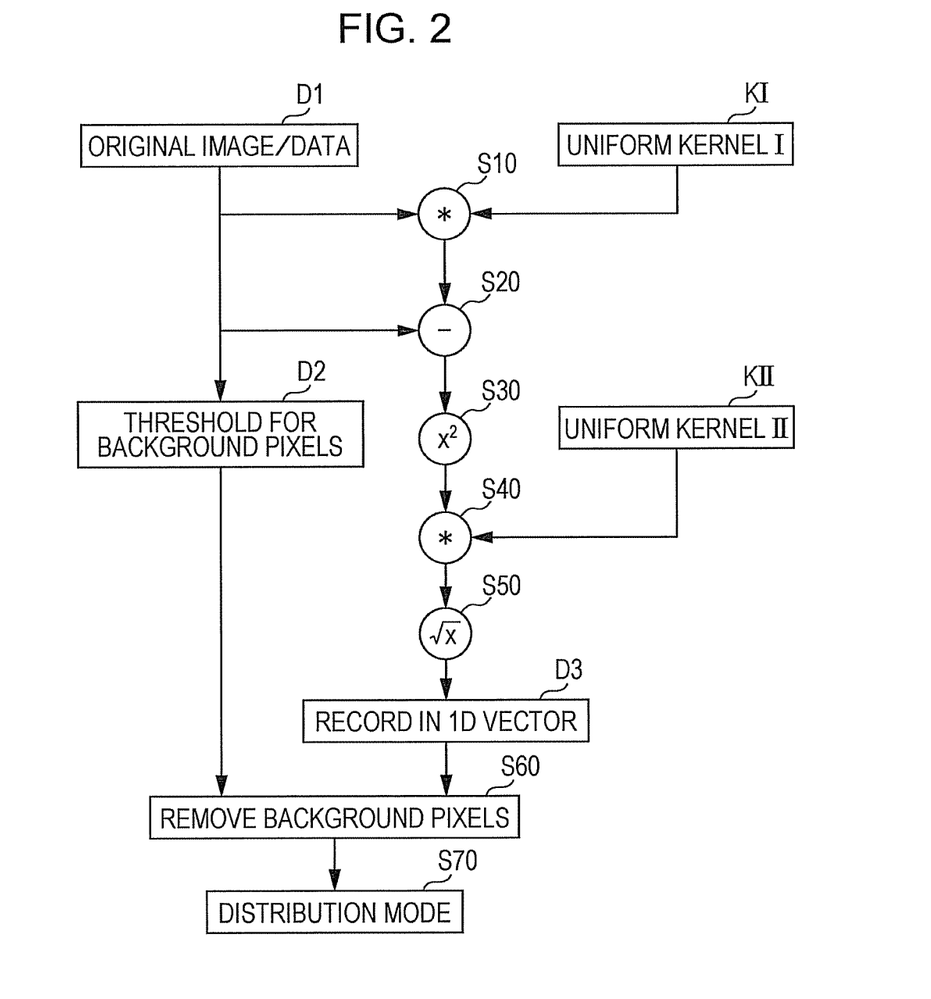
FIG. 2 is a diagram illustrating an overall flow of one exemplary process that is performed by an embodiment of the noise estimator device according to the current invention.

Now referring to FIG. 2, a diagram illustrates an overall flow of one exemplary process that is performed by an embodiment of the noise estimator device 117 according to the current invention. In a step S10, original signal D1 is smoothed by convolving as denoted by an asterisk with a predetermined uniform kernel KI. The original signal is either measured data or image data. One example of the kernel KI is a square kernel such as N×N while another example of the kernel KI is a rectangular kernel such as N×M, where both N and M are an integer. The result of the convolution in the step S10 is now the smoothed or approximated signal. In a step S20, a difference is determined as denoted by a minus sign between the corresponding one of the approximated signals from the step S10 and the original signals D1.

Still referring to FIG. 2, the embodiment of the noise estimator device 117 according to the current invention further performs the additional tasks. In a step S30, the difference as determined in the step S20 is now squared as denoted by $x^2$. In a step S40, the squared result from the step S30 is now again smoothed or approximated by convolving as denoted by an asterisk with a predetermined uniform kernel KII to generate the second smoothed result. One example of the kernel KII is a square kernel such as P×P while another example of the kernel KII is a rectangular kernel such as P×Q, where both P and Q are an integer. The kernels KI and KII are optionally the same in one embodiment while they are different in another embodiment. In a step S50, a square root value of the second smoothed result from the step S40 is now calculated as denoted by a square-root sign. Now PSD has been obtained in the step S50 for a particular pixel neighborhood. Subsequently, in order to generate a histogram, the PSD data is sorted in an ascending order by their values, and the PSD data are recorded in a 1D vector D3. Next, a number of the PSD's in each evenly split value bracket or histogram bin is counted. Thus, the vertical axis is a number or occurrence of a particular PSD while the horizontal axis is the values of the corresponding PSD value in the histogram. In a step S60, certain pixels are removed in the background since these pixels are substantially dominant in their effects in comparison to other useful tissue pixels. In other words, the failure to selectively remove these undesirable pixels may result in some erroneous peaks in the histogram, and the noise assessment will produce a wrong result by interpreting these erroneous peaks reflecting the clinically irrelevant background as the estimated noise level. Finally, in a step S70, a PSD-based noise level is determined as a mode of distribution based upon the above described histogram.

In summary, the above exemplary method of noise estimation method assumes that the pixel population in slow varying regions is more prevalent than that in fast varying regions such as edges. By choosing the distribution mode, the most popular or frequently occurring pseudo standard deviation (PSD) value is selected as a single noise index or universal noise estimator that represents a substantially true noise level of the entire image or signal.

Figure 3A:
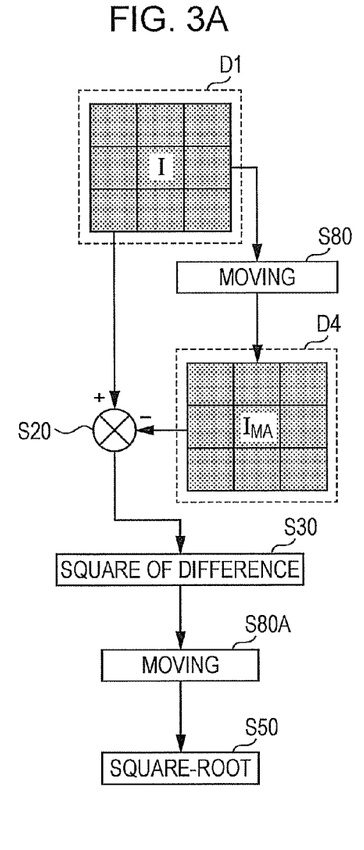
FIG. 3A is a flow chart illustrating some more details of certain steps of the exemplary process that is performed by the embodiment of the noise estimator device according to the current invention.

Now referring to FIG. 3A, a flow chart illustrates some more details of certain steps of the exemplary process that is performed by the embodiment of the noise estimator device 117 according to the current invention. Generally, noise is originated from multiple sources including but not limited to quantum noise in photo count, electronic noise in a data acquisition system (DAS), quantization noise in analog-to-digital conversion (A/D) and approximation during reconstruction. Assuming that the I(x, y) represents an image that has been corrupted by some additive noise, the image data I(x, y) is expressed by the following Equation (1).

$$I(x,y) = I_0(x,y) + n(x,y) \qquad (1)$$

where $I_0$ is an original data or true signal and n is noise that has been added to the original image due to various sources. x and y are the 2D coordinates of a pixel. The steps involved in the flow chart of FIG. 3A are summarized in Equation (2) to determine a predetermined noise index PSD.

$$PSD(x,y) = \sqrt{w(u,v) \otimes [I(x,y) - w(u,v) \otimes I(x,y)]^2} \qquad (2)$$

where $\otimes$ represents convolution operator and w(u, v) is a normalized uniform moving average kernel. The moving average inside brackets calculates the mean value of each pixel neighborhood while the one outside the brackets calculates the neighborhood averages of the mean-square-errors (MSE). Notice that the MSEs are calculated by subtracting the filtered samples instead of subtracting the single average value of the samples as standard deviation formulas normally do. The PSD approaches the "true" standard deviation when the assumptions to (1) are valid. PSD is used to improve computational efficiency of direct calculation of standard deviation (SD).

A histogram approach has been utilized to separate the regions and analyze the noise level in exemplary methods and systems according to the current invention. This approach is based upon a general finding in the most images or signals that slow varying regions are usually large and have significantly more pixel populations than fast change regions such as edges, lines and small patches. With the histogram approach, a bin size is critical to the robustness and accuracy of the noise assessment results. As described above, since the bin size has a trade off in stability and accuracy of the noise assessment, a relatively small bin size is initially used to obtain a histogram, and moving average is subsequently applied to enlarge the bin size while keeping the precision of the bin location. In this regard, assume h(u) is the histogram and m(v) is a 1D normalized moving average kernel, a filtered histogram H(u) is defined by convolution as denoted by $\otimes$ as below in Equation (3), $$H(u) = m(v) \otimes h(u) \qquad (3)$$

where u is the bin location in PSD values. The length (L) of a moving average window is a monotonically increasing function of the location of the maximum ($U_{max}$) in histogram.

The length L is calculated with following Equation (4):

$$L = \text{Larger odd Nearest Integer of } \{U_{max}/k\} \quad (4)$$

Where a factor k is also a function of the data noise level. When $U_{max}$ is less than 10, k=5 assures stable solutions while $U_{ma}$ is above 90, k=3 assures stable solutions. On the other hand, when $U_{max}$ is between 10 and 90, k should be selected using following monotonically decreasing Equation (5):

$$k = \frac{11}{60} + \frac{1}{600} U_{max} \quad (5)$$

The selection of k allows a noisy histogram to be processed by a heavier smoothing kernel while a relatively quiet histogram to be processed by a light or no smoothing kernel.

Furthermore, to assure accurate noise assessment, multiple passes of above procedure are optionally performed in certain exemplary methods and systems of the current invention. Generally, two-pass is sufficient. In the first pass, the count at the first histogram peak is used to decide the best size for the smoothing mask w(u,v). A large mask size is selected for a high count and vice versa. One exemplary set of the mask size is illustrated below:

Count<5000, mask size=7×7
Count>10000, mask size=11×11

Still referring to FIG. 3A, in a step S80, the original image I is smoothed by taking a moving average of the image. That is, a normalized uniform moving average kernel of a predetermined size has been applied. The dotted line indicates an extent of the image outside the neighborhood while the solid line indicates a typical local pixel neighborhood. In this regard, the local pixel neighborhood of D1 in this example is a 3×3 neighborhood containing 9 pixels. By taking moving average over the image I, a new image $I_{MA}$ is created, in which the value of each pixel are the average of its 3×3 neighborhood. For the particular neighborhood D1, corresponding moving average result is D4. As already described with respect to FIG. 2, the result of convolution with a normalized uniform kernel in the step S80 is now a neighborhood-averaging of the image at each pixel. In step S20, a difference is determined as denoted by a minus sign between the corresponding one of the values in D4 from the step S80 and the original signals D1. Furthermore, in a step S30, the difference is squared. In step S80A, neighborhood-average of the squared difference is computed by applying the normalized uniform moving average kernel. Finally, a square root of the result from the step S80A is determined in a step S50. Thus, pseudo standard deviation (PSD) for each pixel in the image has been determined. The normalized uniform moving average kernel in the step S80 and S80A is optionally the same in one method while it is different in another method.

Figure 3B:
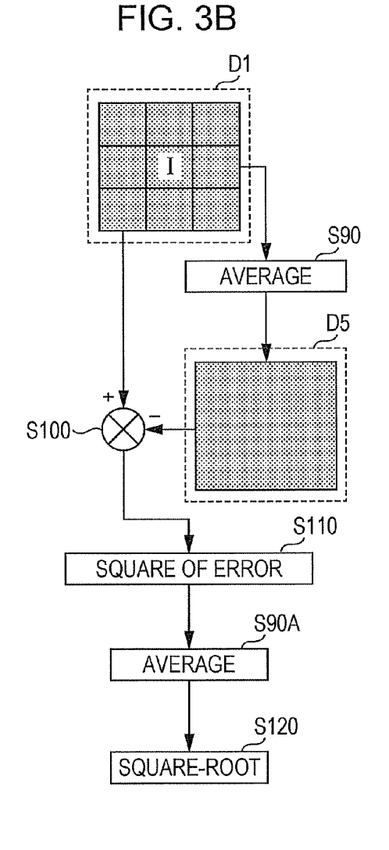
FIG. 3B is a flow chart illustrating some steps of smoothing the original signal by taking an average of the original image in determining standard deviation.

In contrast, referring to FIG. 3B, image I is split into disjoint blocks, as D1 is one of the blocks. In a step S90, block average of D1 is calculated. The average value is assigned to all 3×3 neighborhood in D5. In a step 100, a difference or an error is determined as denoted by a minus sign between the average signals from the step S90 and the original signals D1. Furthermore, in a step S110, the error is squared. In step S90A, block-average of the squared difference is computed. Finally, a square root of the result from the step S90A is determined in a step S120. Thus, normal standard deviation (SD) has been determined.

In summary, the advantage of using the PSD over the normal SD is that PSD may reflect noise SD more accurately by not taking the edge variation as part of the standard deviation component. The PSD approaches the SD in the regions where image has constant or slow varying mean values.

After applying the above described exemplary noise assessment method to a large number of data sets, including phantom data and patient data, the automatic noise assessment results are closely matched with the carefully manually measured standard deviations. In the manual evaluations, manually selected best regions of interest (ROIs) are used as gold standard. As described above, although the following exemplary images are reconstructed CT images, methods and embodiments of noise estimation according to the current invention are not limited to the reconstructed CT images and are applicable to other measured data from CT and other modalities.

Figure 4A:
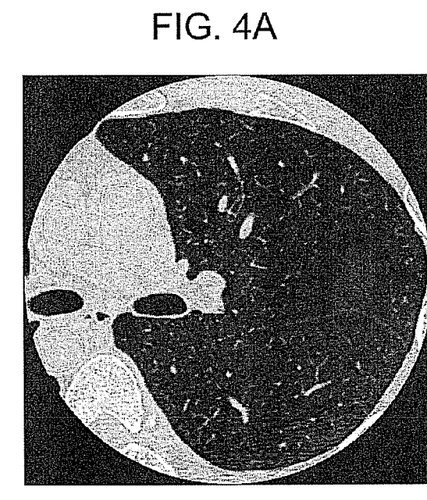
FIG. 4A is an exemplary zoomed lung CT image with two carefully selected (region of interest) ROIs in cardiac muscle regions.
Figure 4B:
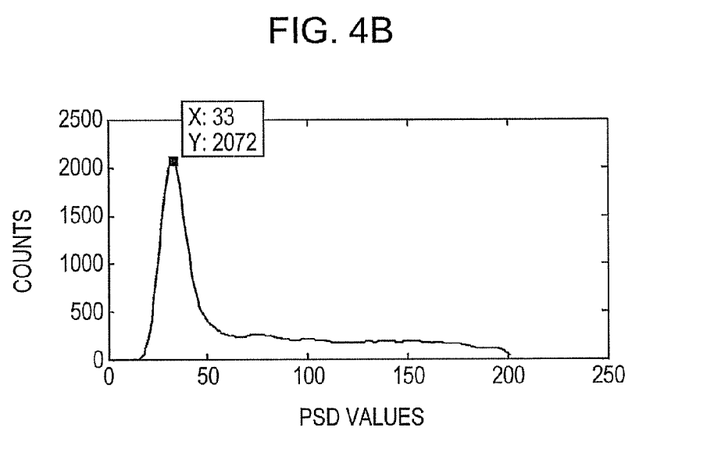
FIG. 4B is a histogram for determining a single noise index based upon the PSDs utilizing the lung CT image of FIG. 4A according to the above described exemplary method of the current invention.

Now referring to FIGS. 4A and 4B, the above described exemplary method of determining a PSD-based universal noise estimate according to the current invention has been applied to lung CT images. FIG. 4A is an exemplary zoomed lung CT image with two carefully selected (region of interest) ROIs as indicated by white lines in cardiac muscle regions. The manual noise assessment was conducted in the two ROIs including ROI11 and ROI12. The standard deviation (SD) of the measured noise was 33.25 HU in ROI11 and 33.79 HU in ROI12. These SD values are compared to a noise index of PSD for the same lung image based upon the above described exemplary method according to the current invention.

Now referring to FIG. 4B, a histogram is generated for determining a single noise index based upon the PSDs utilizing the lung CT image of FIG. 4A according to the above described exemplary method of the current invention. The histogram is generated from PSDs that have been determined for each pixel in the lung CT image. A peak value of 33 HU is automatically selected as a single estimated noise index since the peak represents the most frequently occurring noise value. The automatically calculated noise level is 33 HU, which is substantially matched with the manual measured results of ROI11 and ROI12 in FIG. 4A.

Figure 5A:
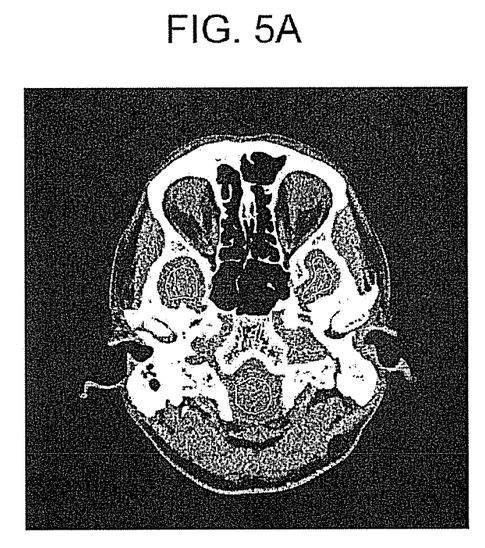
FIG. 5A is an exemplary head CT image with three carefully selected (region of interest) ROIs.
Figure 5B:
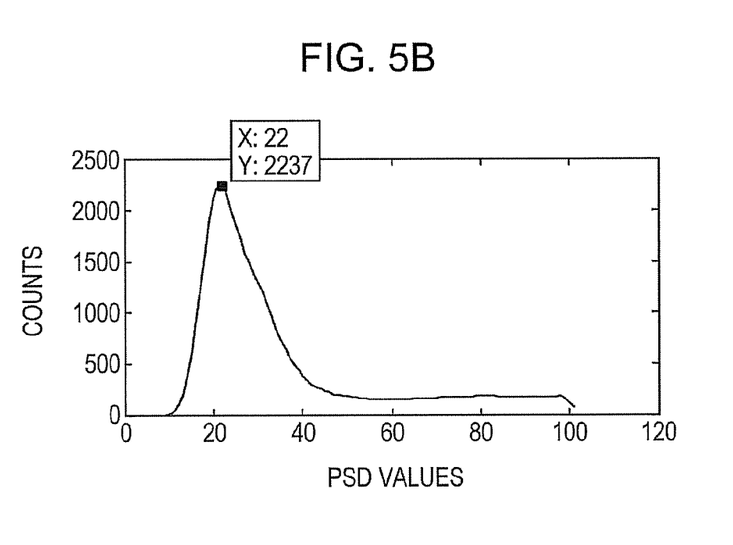
FIG. 5B is a histogram for determining a single noise index based upon the PSDs utilizing the head CT image of FIG. 5A according to the above described exemplary method of the current invention.

Now referring to FIGS. 5A and 5B, the above described exemplary method of determining a PSD-based universal noise estimate according to the current invention has been applied to lung CT images. FIG. 5A is an exemplary head CT image with three carefully selected (region of interest) ROIs as indicated by white lines. The manual noise assessment was conducted in the three ROIs including ROI11, ROI12 and ROI13. The standard deviation (SD) of the measured noise was 21.49 HU in ROI11, 21.76 HU ROI12 and 23.70 HU in ROI13. These SD values are compared to a noise index of PSD for the same head image based upon the above described exemplary method according to the current invention.

Now referring to FIG. 5B, a histogram is generated for determining a single noise index based upon the PSDs utilizing the head CT image of FIG. 5A according to the above described exemplary method of the current invention. The histogram is generated from PSDs that have been determined for each pixel in the head CT image. A peak value of 22 HU is automatically selected as a single estimated noise index since the peak represents the most frequently occurring noise value. The automatically calculated noise level is 22 HU, which is substantially matched with the manual measured results of ROI11, ROI12 and ROI13 in FIG. 5A.

Figure 6A:
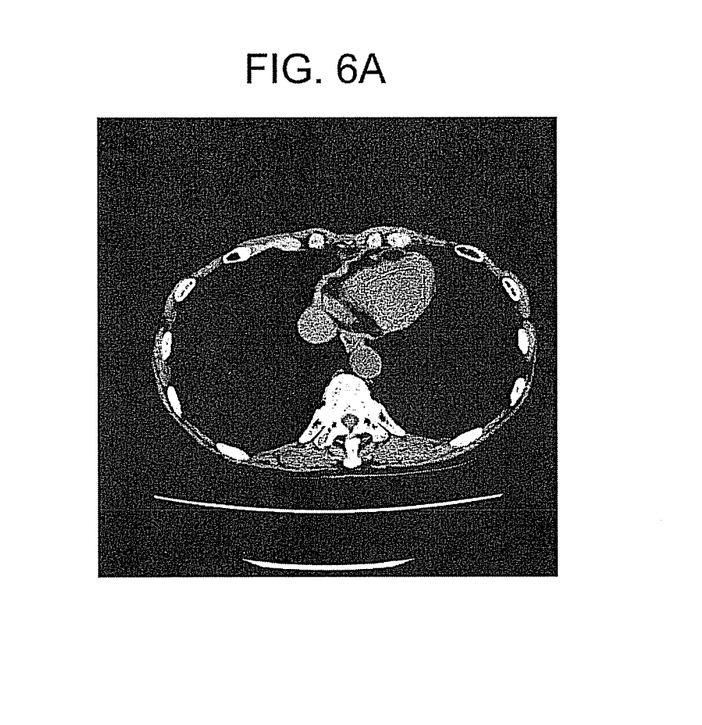
FIG. 6A is an exemplary abdomen CT image with one carefully selected (region of interest) ROI.
Figure 6B:
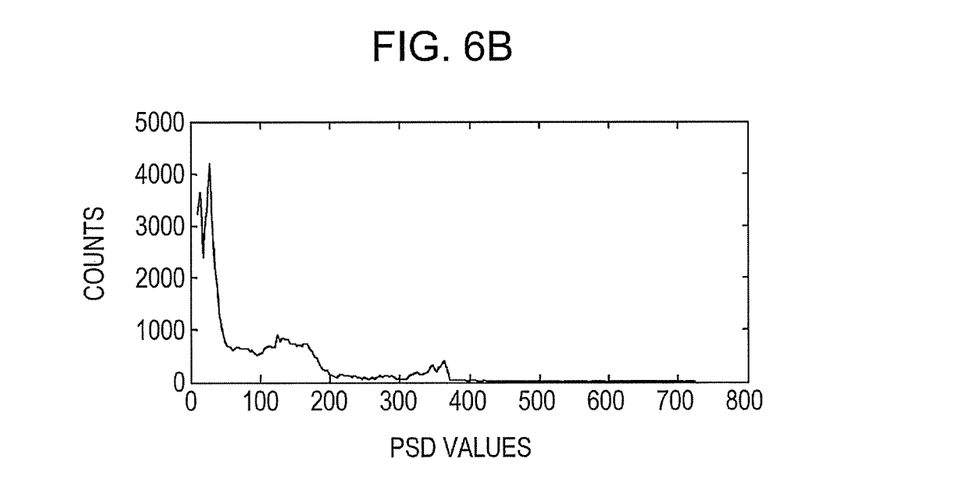
FIG. 6B is a histogram for determining a single noise index based upon the PSDs utilizing the abdomen CT image of FIG. 6A according to the above described exemplary method of the current invention.

Now referring to FIGS. 6A and 6B, the above described exemplary method of determining a PSD-based universal noise estimate according to the current invention has been applied to abdomen CT images. FIG. 6A is an exemplary abdomen CT image with one carefully selected (region of interest) ROI as indicated by a white line. The manual noise assessment was conducted in the ROI. The standard deviation (SD) of the measured noise was 11.77 HU. These SD values are compared to a noise index of PSD for the same abdomen image based upon the above described exemplary method according to the current invention.

Now referring to FIG. 6B, a histogram is generated for determining a single noise index based upon the PSDs utilizing the abdomen CT image of FIG. 6A according to the above described exemplary method of the current invention. The histogram is generated from PSDs that have been determined for each pixel in the abdomen CT image. A peak value of 13 HU is automatically selected as a single estimated noise index since the peak represents the most frequently occurring noise value. The automatically calculated noise level is 13 HU, which is substantially matched with the manual measured results of ROI in FIG. 6A.

Figure 7:
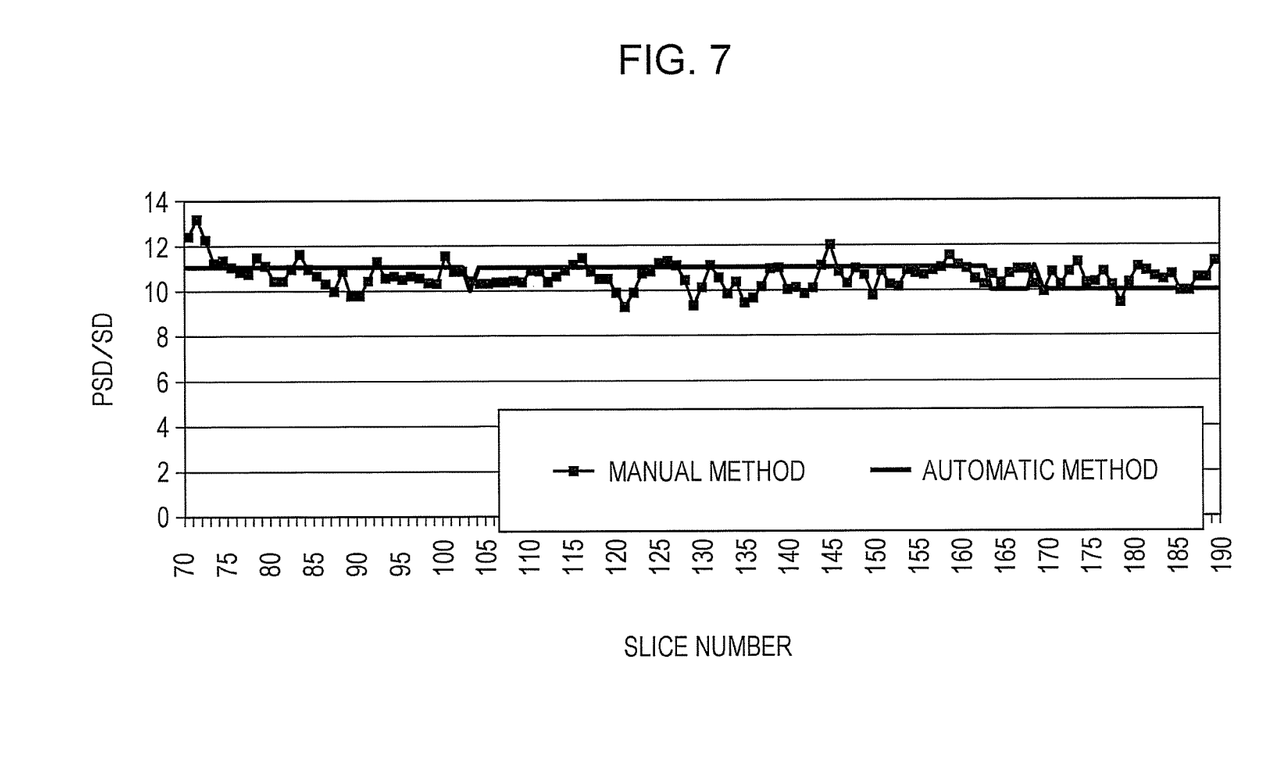
FIG. 7 is a graph illustrating the comparison of the PSD values and the SD values across the CT slices in the head region.

In addition to the above described ROI approach, a PSD value is compared to its counterpart standard deviation (SD) on slices through whole volumes in different body regions in the CT image. FIG. 7 is a graph illustrating the comparison of the PSD values and the SD values across the CT slices in the head region. The x axis indicates the slice numbers, and the y axis indicates either PSD or SD values. A solid line indicates the automatically determined PSD values on the corresponding slices while a solid line with squares indicates manually determined SD values. Through out the slices in the head in the entire volume, the automatically determined PSD values substantially match the manually determined SD values.

Figure 8:
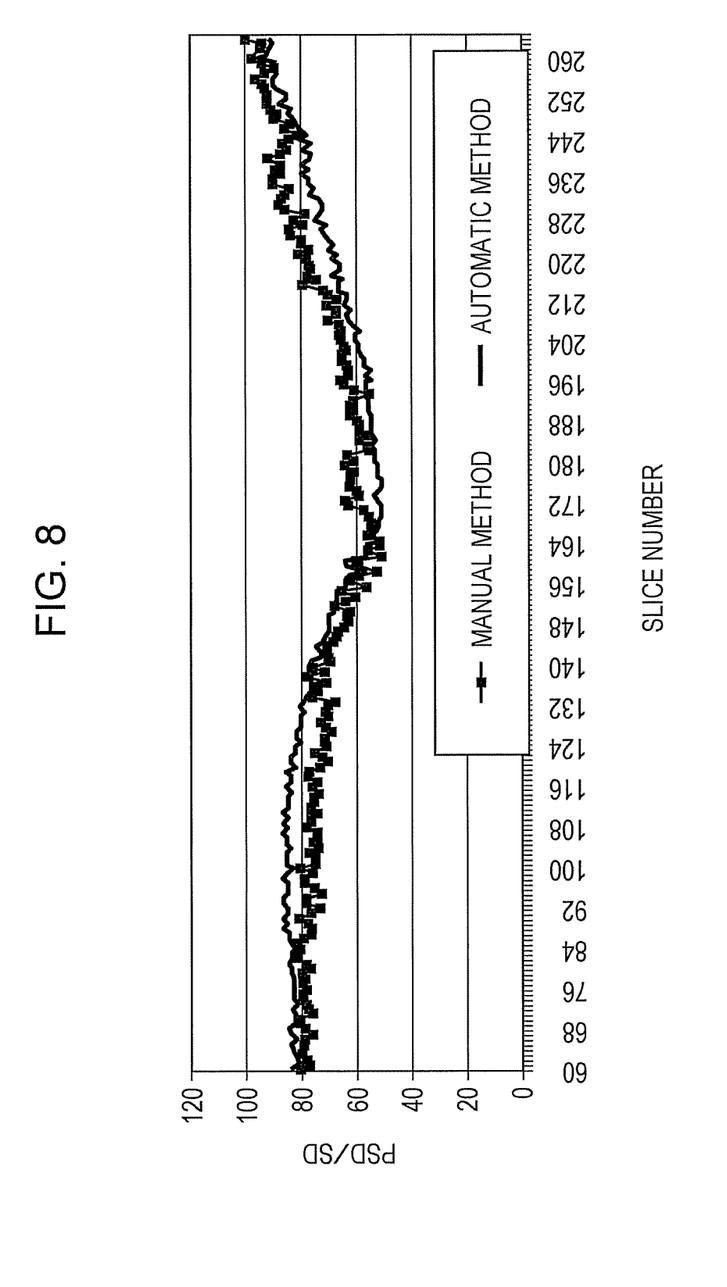
FIG. 8 is a graph illustrating the comparison of the PSD values and the SD values across the CT slices in the abdomen region.

FIG. 8 is a graph illustrating the comparison of the PSD values and the SD values across the CT slices in the abdomen region. The x axis indicates the slice numbers, and the y axis indicates either PSD or SD values. A solid line indicates the automatically determined PSD values on the corresponding slices while a solid line with squares indicates manually determined SD values. Through out the slices in the abdomen in the entire volume, the automatically determined PSD values substantially match the manually determined SD values.

Figure 9:
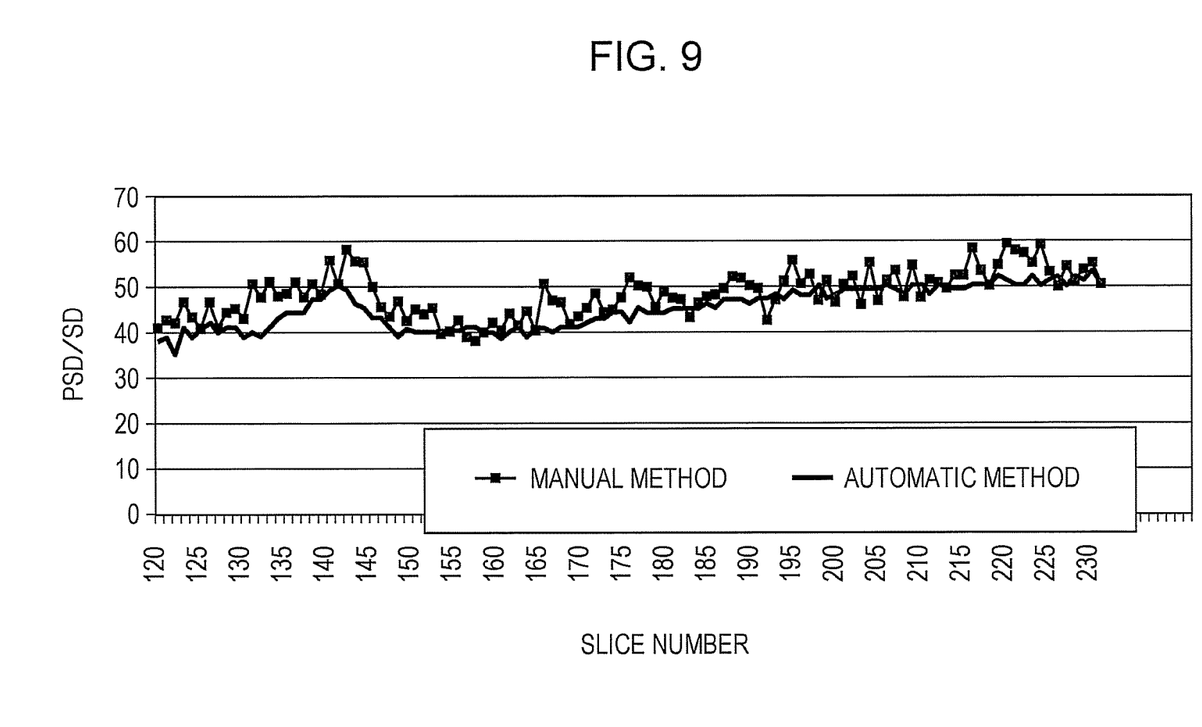
FIG. 9 is a graph illustrating the comparison of the PSD values and the SD values across the CT slices in the cardiac region.

FIG. 9 is a graph illustrating the comparison of the PSD values and the SD values across the CT slices in the cardiac region. The x axis indicates the slice numbers, and the y axis indicates either PSD or SD values. A solid line indicates the automatically determined PSD values on the corresponding slices while a solid line with squares indicates manually determined SD values. Through out the slices in the heart in the entire volume, the automatically determined PSD values substantially match the manually determined SD values.

In the above described approach of determining a single noise estimate index, a most representative PSD value is automatically selected for an entire image, whole volume or a complete set of data in an exemplary method or system according to the current invention. To safeguard the single selection approach, a plurality of noise estimate index values is determined from the PSD values in a more particular region or area of interest rather than entire image, whole volume or a complete set of data in another exemplary method or system according to the current invention.

Figure 10A:
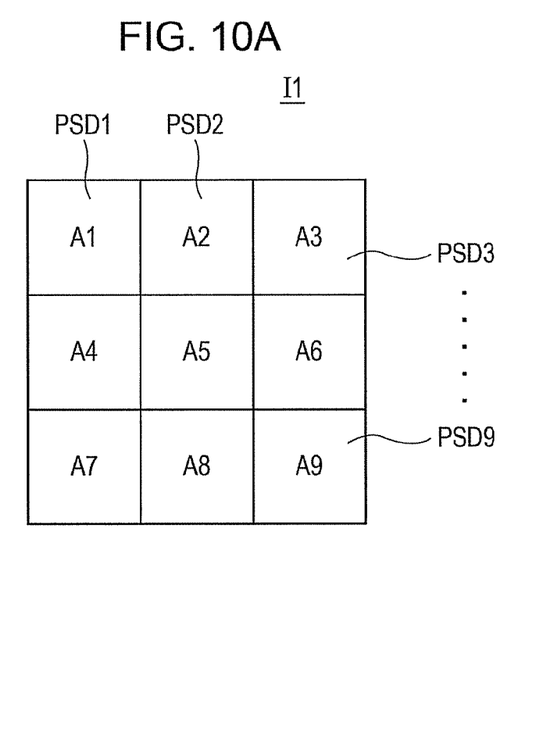
FIG. 10A is a diagram illustrating multiple intermediate PSD values for equal-size regions of an entire image.
Figure 10B:
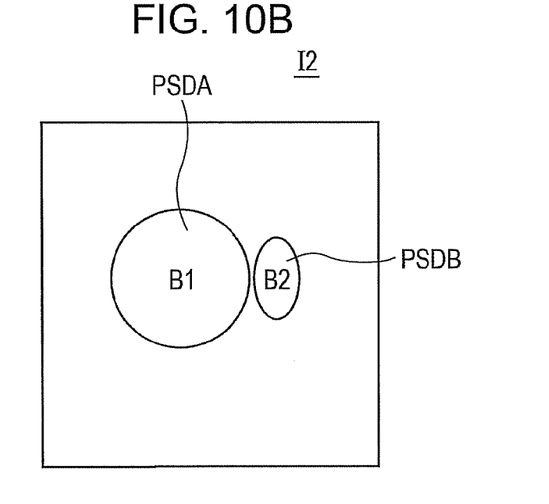
FIG. 10B is a diagram illustrating multiple intermediate PSD values for unequal regions in size.

Now referring to FIGS. 10A and 10B, diagrams illustrate a plurality of noise estimate index values that is selected from the PSD values in a more particular region or area of in another exemplary method or system according to the current invention. FIG. 10A illustrates multiple intermediate PSD values for equal-size regions of an entire image. An entire image pixel area I1 is divided into nine equal-size portions A1 through A9. PSD values are originally determined for each pixel in the image I1 according to the above described method and system according to the current invention. Subsequently, a single most representative PSD value is automatically selected in each of the predetermined equal-size portions A1 through A9 rather than for the entire image I1. Since the multiple PSD values retain substantially local noise characteristics of each of the portions A1 through A9, each of the selected PSD noise estimate values is optionally determined in certain situations. The multiple intermediate noise estimates may advantageously eliminate a need for manually removing background noise. The multiple intermediate noise estimates may be advantageous in images that prevalently contain fast-changing pixel population such as edges.

Now referring to FIG. 10B, a diagram illustrates multiple intermediate PSD values for unequal regions in size. An entire image pixel area I2 is divided into a predetermined number of unequal-size portions B1 and B2. For example, the unequal-size portions B1 and B2 are respectively a region of interest (ROI), each containing a particular structure of medical interest. PSD values are originally determined for each pixel in the image I2 according to the above described method and system according to the current invention. Subsequently, a single most representative PSD value is automatically selected in each of the predetermined unequal-size portions B1 and B2 rather than for the entire image I2. Since the multiple PSD values retain substantially local noise characteristics of each of the medically significant areas B1 and B2, each of the selected PSD noise estimate values is optionally determined in certain situations. The multiple intermediate noise estimates may advantageously eliminate a need for manually removing background noise. The multiple intermediate noise estimates may be advantageous in images that prevalently contain fast-changing pixel population such as edges.

Figure 11:
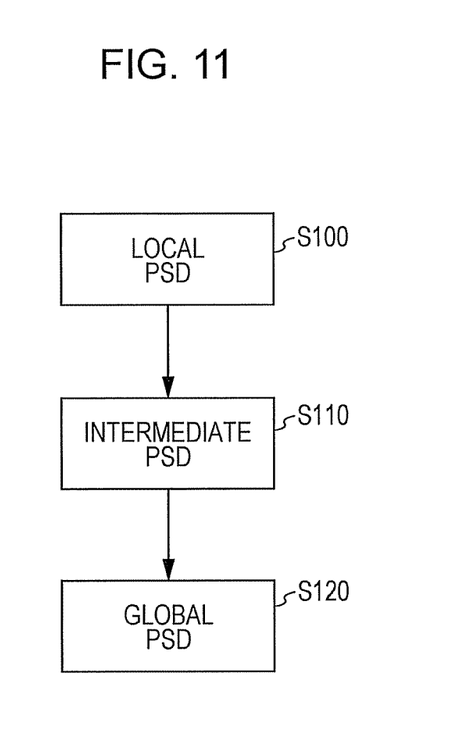
FIG. 11 is a diagram illustrating a general concept of utilizing the PSD-based noise estimate values as determined by the above described exemplary methods and systems of the current invention.

Now referring to FIG. 11, a diagram illustrates a general concept of utilizing the PSD-based noise estimate values as determined by the above described exemplary methods and systems of the current invention. The concept is also illustrated in a flow of processing PSD values after they are determined for each of the pixel in an entire image according to the current invention. In a step S100, PSD values are determined for each of the pixels according to a predetermined pixel neighborhood size. Since each of these PSD values are substantially sensitive to the local data, these PSD values are termed local PSD values as shown in the step S100.

In a subsequent step S110, intermediate PSD values are optionally determined based upon the local PSD values of the step S100. As described with respect to FIGS. 10A and 10B, the intermediate PSD values are determined according to a predetermined set of rules. As illustrated in the examples, the intermediate PSD values are optionally selected for equal-size or unequal-size portions of the image. In any case, the intermediate PSD values are not a single representative noise estimate value of the entire image, volume, slices or data. In implementing the determination of the intermediate PSD values, multiple histograms are generated for the portions or areas of the entire image, volume, slices or data according to one embodiment of the current invention. Multiple PSD-based values are not limited to the above criteria and are optionally determined based upon other data characteristics such as angular dependence of the measured signals.

Still referring to FIG. 11, a single representative PSD value is optionally determined based upon the local PSD values of the step S100 and or the intermediate PSD values of the step S110. As described with respect to FIGS. 10A and 10B, the intermediate PSD values are determined according to a predetermined set of rules. As illustrated in the examples, a plurality of the intermediate PSD values is optionally selected for equal-size or unequal-size portions of the image. In contrast, a single representative PSD value is assigned as a global PSD-based noise index to the entire image, volume, slices or data according to another embodiment of the current invention.

The global PSD-based noise index is optionally determined in combination with the intermediate PSD values. Alternatively, the global PSD-based noise index is optionally determined as a single noise estimate index.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of estimating noise in signals, comprising the steps of:
   a) detecting signals by a medical imaging device including a CT scanner, a MRI scanner, an Ultrasound scanner and a PET scanner to generate measured data;
   b) reconstructing an image based upon the measured data to generate image data;
   c) approximating a predetermined set of at least one of the measured data and the image data to true signals by a predetermined rule to generate approximated signals;
   d) determining a difference between each of the approximated signals and an corresponding one of the measured data and the image data;
   e) determining a pseudo standard deviation value based upon the difference for each of the approximated signals;
   f) repeating said step c) through e) for at least the corresponding one of the predetermined set of the measured data and the image data; and
   g) selecting at least one representative noise level based upon the pseudo standard deviation values.

2. The method of estimating noise in signals according to claim 1 wherein said step c) of approximating is performed by a running-average technique.

3. The method of estimating noise in signals according to claim 1 wherein said step e) of determining the pseudo standard deviation value is accomplished by taking a square root value after convolving a predetermined filter and a squared value of the difference.

4. The method of estimating noise signals according to claim 1 wherein an additional step of determining a size of a noise evaluation block for the representative noise level before said step g).

5. The method of estimating noise in signals according to claim 4 wherein the noise evaluation block contains an entire image.

6. The method of estimating noise in signals according to claim 4 wherein the noise evaluation block contains a portion of an entire image.

7. The method of estimating noise in signals according to claim 6 wherein the noise evaluation blocks are equal in size.

8. The method of estimating noise in signals according to claim 6 wherein the noise evaluation blocks are unequal in size.

9. The method of estimating noise in signals according to claim 6 wherein the noise evaluation blocks contain a certain clinically significant structure.

10. The method of estimating noise in signals according to claim 1 wherein a most frequently occurring pseudo standard deviation value is selected as the one representative noise level.

11. The method of estimating noise in signals according to claim 1 further comprising an additional step of removing certain background portions before the step e).

12. The method of estimating noise in signals according to claim 11 wherein the background portions include portions outside of field of view and known irrelevant portions including portions corresponding to bones.

13. The method of estimating noise in signals according to claim 1 wherein said step e) of determining at least one representative noise level based upon a histogram that plots frequency counts and the pseudo standard deviation values.

14. The method of estimating noise in signals according to claim 13 wherein the histogram is smoothed before said step g) by varying a running average size with respect to a maximal frequency value.

15. The method of estimating noise in signals according to claim 1 wherein said step c) of approximating is by a uniform kernel.

16. The method of estimating noise in signals according to claim 1 wherein said step c) of approximating is by a weighted kernel.

17. The method of estimating noise in signals according to claim 1 further comprising additional step of h) repeating said step c) through e) for a predetermined set of the signals so as to perform a 3D evaluation among 2D slices after said step f), wherein said step g) selects the representative noise level among the 2D slices.

18. A system for estimating noise in signals, comprising:
   a noise estimator device for approximating a predetermined set of signals to true signals by a predetermined rule to generate approximated signals, said noise estimator device determining a difference between each of the approximated signals and an corresponding one of the signals, said noise estimator device determining a pseudo standard deviation value based upon the difference for each of the approximated signals, said noise estimator device determining a plurality of the pseudo standard deviation values for the predetermined set of the signals, and said noise estimator device selecting at least one representative noise level based upon the pseudo standard deviation values.

19. The system for estimating noise in signals according to claim 18 wherein said noise estimator device determines the pseudo standard deviation value based upon the difference for each of the approximated signals by a running-average technique.

20. The system for estimating noise in signals according to claim 18 wherein said noise estimator device determines the pseudo standard deviation value based upon the difference for each of the approximated signals by taking a square toot value after convolving a predetermined filter and a squared value of the difference.

21. The system for estimating noise signals according to claim 18 wherein said noise estimator device additionally determines a size of a noise evaluation block for the representative noise level before said noise estimator device selects at least one representative noise level based upon the pseudo standard deviation values.

22. The system for estimating noise in signals according to claim 21 wherein the noise evaluation block contains an entire image.

23. The system for estimating noise in signals according to claim 21 wherein the noise evaluation block contains a portion of an entire image.

24. The system for estimating noise in signals according to claim 23 wherein the noise evaluation blocks are equal in size.

25. The system for estimating noise in signals according to claim 23 wherein the noise evaluation blocks are unequal in size.

26. The system for estimating noise in signals according to claim 23 wherein the noise evaluation blocks contain a certain clinically significant structure.

27. The system for estimating noise in signals according to claim 18 wherein said noise estimator device selects a most frequently occurring pseudo standard deviation value as the one representative noise level.

28. The system for estimating noise in signals according to claim 18 wherein the signals are measured signals before reconstructing images.

29. The system for estimating noise in signals according to claim 28 wherein the measured signals are detected by a medical imaging device including a CT scanner, a MRI scanner, a Ultrasound scanner and a PET scanner.

30. The system for estimating noise in signals according to claim 18 wherein the signals are image data after reconstructing images.

31. The system for estimating noise in signals according to claim 30 wherein said noise estimator device performs an additional task of removing certain background portions before said noise estimator device determining a pseudo standard deviation value based upon the difference for each of the approximated signals.

32. The system for estimating noise in signals according to claim 31 wherein the background portions include portions outside of field of view and known irrelevant portions including portions corresponding to bones.

33. The system for estimating noise in signals according to claim 18 wherein said noise estimator device determines at least one representative noise level based upon a histogram that plots frequency counts and the pseudo standard deviation values.

34. The system for estimating noise in signals according to claim 33 wherein the histogram is smoothed before varying a running average size with respect to a maximal frequency value.

35. The system for estimating noise in signals according to claim 18 wherein said noise estimator device approximates using a uniform kernel.

36. The system for estimating noise in signals according to claim 18 wherein said noise estimator device approximates using a weighted kernel.

37. The system for estimating noise in signals according to claim 18 wherein said noise estimator device performs a 3D evaluation among 2D slices.

* * * * *